United States Patent
Yamamoto et al.

(10) Patent No.: US 11,775,612 B2
(45) Date of Patent: Oct. 3, 2023

(54) LEARNING DATA GENERATING APPARATUS, LEARNING DATA GENERATING METHOD, AND NON-TRANSITORY COMPUTER READABLE-STORAGE MEDIUM

(71) Applicant: CANON KABUSHIKI KAISHA, Tokyo (JP)

(72) Inventors: Shinji Yamamoto, Kanagawa (JP); Takato Kimura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 43 days.

(21) Appl. No.: 17/512,796

(22) Filed: Oct. 28, 2021

(65) Prior Publication Data
US 2022/0188572 A1    Jun. 16, 2022

(30) Foreign Application Priority Data
Dec. 16, 2020    (JP) .................. 2020-208102

(51) Int. Cl.
| | | |
|---|---|---|
| G06V 10/00 | (2022.01) | |
| G06F 18/214 | (2023.01) | |
| G06T 3/00 | (2006.01) | |
| G06F 18/21 | (2023.01) | |
| G06F 18/243 | (2023.01) | |

(52) U.S. Cl.
CPC ...... *G06F 18/2148* (2023.01); *G06F 18/2193* (2023.01); *G06F 18/24317* (2023.01); *G06T 3/0056* (2013.01)

(58) Field of Classification Search
CPC ......... G06N 3/08; G06N 3/023; G06N 20/00; G06K 9/6257; G06K 9/6265; G06K 9/6281; G06K 9/4604; G06F 18/2148; G06F 18/24317; G06F 18/2193; G06F 17/15; G06V 10/774; G06V 10/776; G06T 3/0056; G06T 2207/20081
See application file for complete search history.

(56) References Cited

U.S. PATENT DOCUMENTS

| | | | |
|---|---|---|---|
| 4,875,810 A | 10/1989 | Chiba et al. | |
| 5,504,847 A | 4/1996 | Kimura et al. | |
| 5,619,619 A * | 4/1997 | Shinohara ............... | G06V 40/16 706/41 |
| 5,774,230 A * | 6/1998 | Goto ....................... | H04N 1/603 382/167 |
| 6,215,224 B1 | 4/2001 | Kataoka et al. | |

(Continued)

OTHER PUBLICATIONS

Joseph Redmon, YOLOv3: An Incremental Improvement, CVPR2018, Apr. 8, 2018.

(Continued)

*Primary Examiner* — Amir Alavi
(74) *Attorney, Agent, or Firm* — Venable LLP (57) ABSTRACT

In order to provide a learning data generating apparatus that is able to efficiently restrain erroneous detections, the learning data generating apparatus includes a data acquisition unit configured to acquire learning data including teacher data, and a generation unit configured to generate generated learning data based on the learning data and a generating condition, wherein the generation unit converts teacher data of a positive instance into teacher data of a negative instance according to a preset rule when generating the generated learning data.

10 Claims, 12 Drawing Sheets

(56) References Cited

U.S. PATENT DOCUMENTS

| | | | |
|---|---|---|---|
| 6,229,402 B1 | 5/2001 | Kataoka et al. | |
| 6,832,217 B1 * | 12/2004 | Kindo | G06F 16/9535 |
| | | | 707/999.005 |
| 6,885,132 B2 | 4/2005 | Takemura et al. | |
| 6,987,345 B2 | 1/2006 | Yamamoto | |
| 7,183,691 B2 | 2/2007 | Yamamoto | |
| 7,532,743 B2 * | 5/2009 | Morisada | G06V 40/161 |
| | | | 382/165 |
| 8,526,690 B2 * | 9/2013 | Kitamura | G06T 7/162 |
| | | | 382/128 |
| 10,198,669 B2 * | 2/2019 | Kitamura | G06T 7/11 |
| 10,444,617 B2 * | 10/2019 | Nakatani | G01B 11/005 |
| 10,546,217 B2 | 1/2020 | Albright et al. | |
| 11,107,464 B2 * | 8/2021 | Li | G06F 18/25 |
| 11,321,618 B2 * | 5/2022 | Nonaka | G06V 40/20 |
| 11,386,354 B2 * | 7/2022 | Sonobe | G06F 16/285 |
| 2021/0201079 A1 * | 7/2021 | Watanabe | G06F 17/15 |
| 2022/0188572 A1 * | 6/2022 | Yamamoto | G06V 10/82 |

OTHER PUBLICATIONS

Zhun Zhong et al., Random Erasing Data Augmentation, CVPR2017, Nov. 16, 2017.

\* cited by examiner

| Category | Property | Generating condition |
|---|---|---|
| Mannequin | There is no head | Painting out head region by background pixels |
| Mannequin | Skin region is white | Painting out skin region in white |
| Mannequin | Temperature is low | Lowing temperature of subjec |
| Clothes | There is no head | Painting out head region by background pixels |
| Clothes | Depth is plane | Making depth of subject to be plane |
| Poster | Depth is plane | Making entire image to be plane |
| Poster | Temperature is low | Lowing temperature of subject |
| Image by mirror | Depth is plane | Making periphery of subject to be plane |
| Image by mirror | Temperature is low | Lowing temperature of subject |
| Person putting up umbrella | There is no head | Painting out head region by background pixels |

LEARNING DATA GENERATING APPARATUS, LEARNING DATA GENERATING METHOD, AND NON-TRANSITORY COMPUTER READABLE-STORAGE MEDIUM

BACKGROUND OF THE INVENTION

Field of the Invention

The present invention relates to a learning data generating apparatus or the like for performing an object detection from an image.

Description of the Related Art

For the purpose of counting the number of subjects captured by a monitoring camera, the subjects in images are detected, and at that time, when, for example, a person is the subject, a face detection, a head detection, and a moving body detection and the like are performed.

In counting the number of the subjects using an object detection, it is preferable that undetection and erroneous detections be restrained as much as possible, and an accurate number of objects be acquired. However, when there are objects resembling the subjects (for example, mannequins or printed people on a poster in a case in which it is desired to count people) in an image, it may frequently occur that these are erroneously detected as subjects.

As attempts to restrain erroneous detections in an object detection, there are U.S. patent Ser. No. 10/546,217 and Non-patent literature 1 (Zhun Zhong, Liang Zheng, Guoliang Kang, Shaozi Li, Yi Yang, "Random Erasing Data Augmentation", CVPR2017). In U.S. patent Ser. No. 10/546,217, the robustness against background changes is improved by extracting a subject region from an existing learning data and by adding an image in which the subject region is combined with a different background image to the learning data. Moreover, in Non-patent Publication 1, the robustness against changes in appearance is improved by combining random patches with an existing learning data so as to achieve expansion to multiple correct data.

On the other hand, as a technique for detecting an object region, in recent years, many deep learning methods using a CNN (Convolutional Neural Network) have been developed. In Non-patent Publication 2 (Joseph Redmon Ali Farhadi, "YOLOv3: An Incremental Improvement", CVPR2018), as an object detection technique using a CNN, a method is disclosed in which a rectangle including the object and the type of the object are deemed to be correct answers, and the position, size, and type of the object are made to be learned.

Both of U.S. patent Ser. No. 10/546,217 and Non-patent Publication 1 disclose means that expand the existing learning data to multiple positive instance data. However, in a case in which the subjects whose detection should be restrained resemble subjects, many images of non-subjects were required; therefore, it was difficult to restrain erroneous detections of non-subjects.

The present invention was made in view of such a problem, and an object thereof is to provide a learning data generating apparatus that is able to efficiently restrain erroneous detections.

SUMMARY OF THE INVENTION

As an aspect to achieve the above object, a learning data generating apparatus of the present invention includes a data acquisition unit configured to acquire learning data including teacher data, and a generation unit configured to generate generated learning data based on the learning data and a generating condition, wherein the generation unit converts teacher data of a positive instance into teacher data of a negative instance according to a preset rule when generating the generated learning data.

Further features of the present invention will become apparent from the following description of embodiments with reference to the attached drawings.

DESCRIPTION OF THE EMBODIMENTS

Hereinafter, a preferable mode of the present invention will be explained using an embodiment with reference to the attached drawings. In addition, in each of the drawings, the same reference symbols are given to the identical members or elements, and the duplicated explanations therefor are omitted or simplified.

It should be noted that the learning apparatus to be explained in the present embodiment is one which constructs a model for executing an object detection using CNN, and an example in which a rectangle enclosing a person is made to be a detection subject will be explained.

Figure 1:
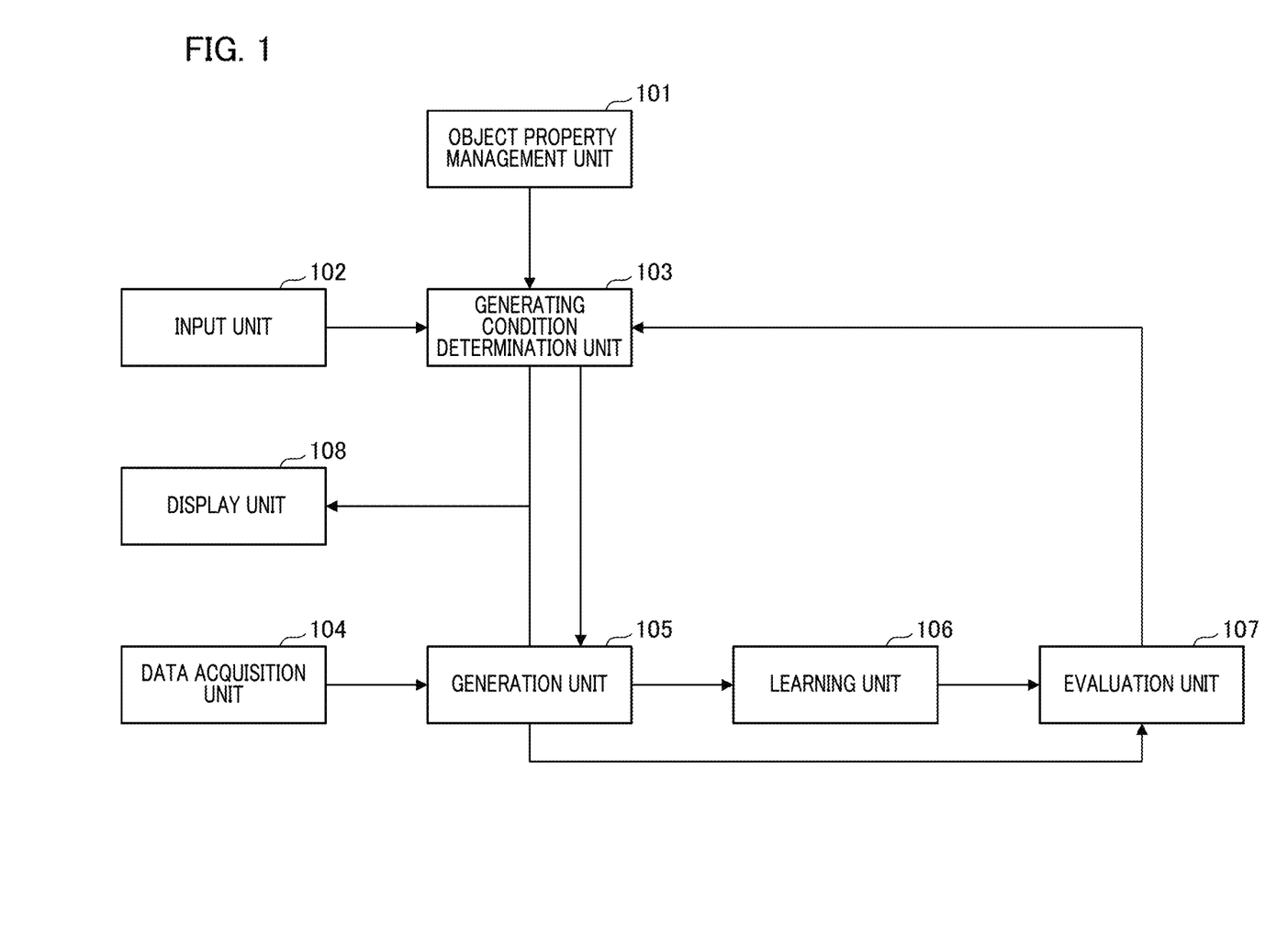
FIG. 1 is a block diagram showing a schematic configuration of a learning apparatus in an embodiment of the present invention.

FIG. 1 is a block diagram showing a schematic configuration of a learning apparatus 100 in the present embodiment. Reference symbol 101 indicates an object property management unit, reference symbol 102 indicates an input unit, reference symbol 103 indicates a generating condition determination unit, reference symbol 104 indicates a data acquisition unit, reference symbol 105 indicates a generation unit, reference symbol 106 indicates a learning unit, reference symbol 107 indicates an evaluation unit, and reference symbol 108 indicates a display unit.

Figure 2:
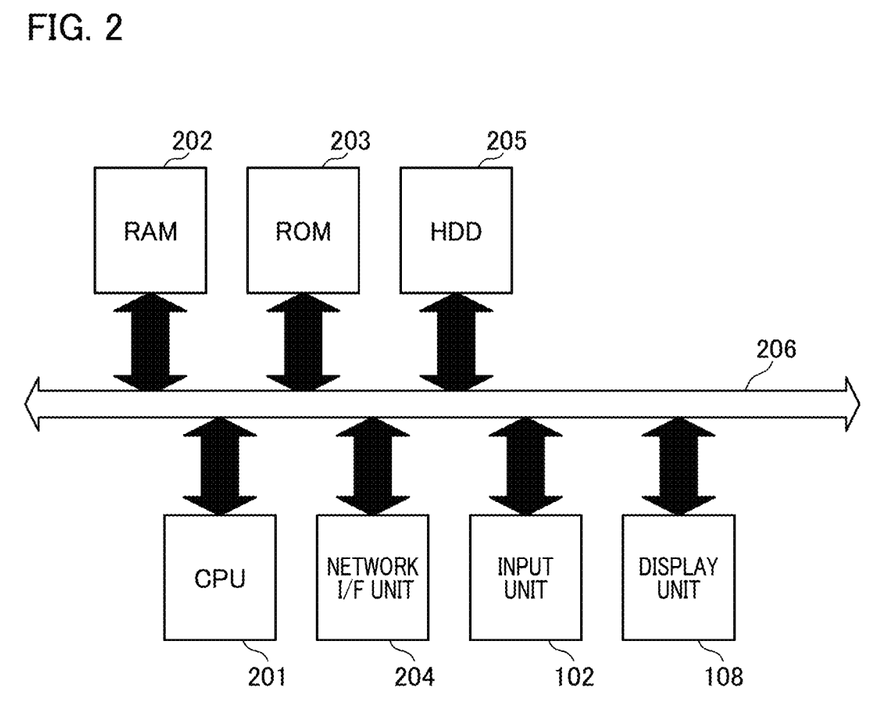
FIG. 2 is a hardware configuration diagram of the learning apparatus of the embodiment.

FIG. 13 is a diagram showing an example of a hardware configuration of the learning apparatus 100.

The learning apparatus 100 includes a CPU 201, a RAM 202, a ROM 203, a network I/F unit 204, an HDD 205, and a data bus 206. The CPU 201 reads out a controlling computer program stored in the ROM 203, loads it to the RAM 202, and executes various control processes. The RAM 202 is used as a temporary storage region for the program to be executed by the CPU 201, for a work memory, and the like.

The network I/F unit 204 transmits and receives various types of information between the learning apparatus 100 and the other devices via the internet. The HDD 205 stores image data, feature quantity data, and various programs. The image data and the like received from external devices via the network I/F unit 204 are transmitted to or received from the CPU 201, the RAM 202, and ROM 203 via the data bus 206.

Image processing with respect to the image data is realized by an image processing program, which is stored in the ROM 203 and the HDD 205, being executed by the CPU 201. It should be noted that one or more pieces of dedicated hardware other than the CPU 201 may be provided, and at least a portion of the processing by the CPU 201 may be executed by the dedicated hardware. As the dedicated hardware, there are a GPU (Graphics Processing Unit), an ASIC (Application Specific Integrated Circuit), an FPGA (Field Programmable Gate Array), and a DSP (Digital Signal Processor), and the like.

In addition, the HDD 205 can be input data from external devices via the network I/F unit 204, and it is assumed that a large number of files including the image data has been already stored therein.

It should be noted that the input unit 102 is, for example, a key board, a mouse, a touch panel, and the like, the display unit 108 includes, for example, a display device such as a liquid crystal display, and both of the input unit 102 and the display unit 108 are connected to the data bus 206.

The object property management unit 101 manages category information, a property, and a generating condition of an object that tends to be erroneously detected, i.e., an object of which detection a user would like to restrain, in an associated manner.

Figure 3:
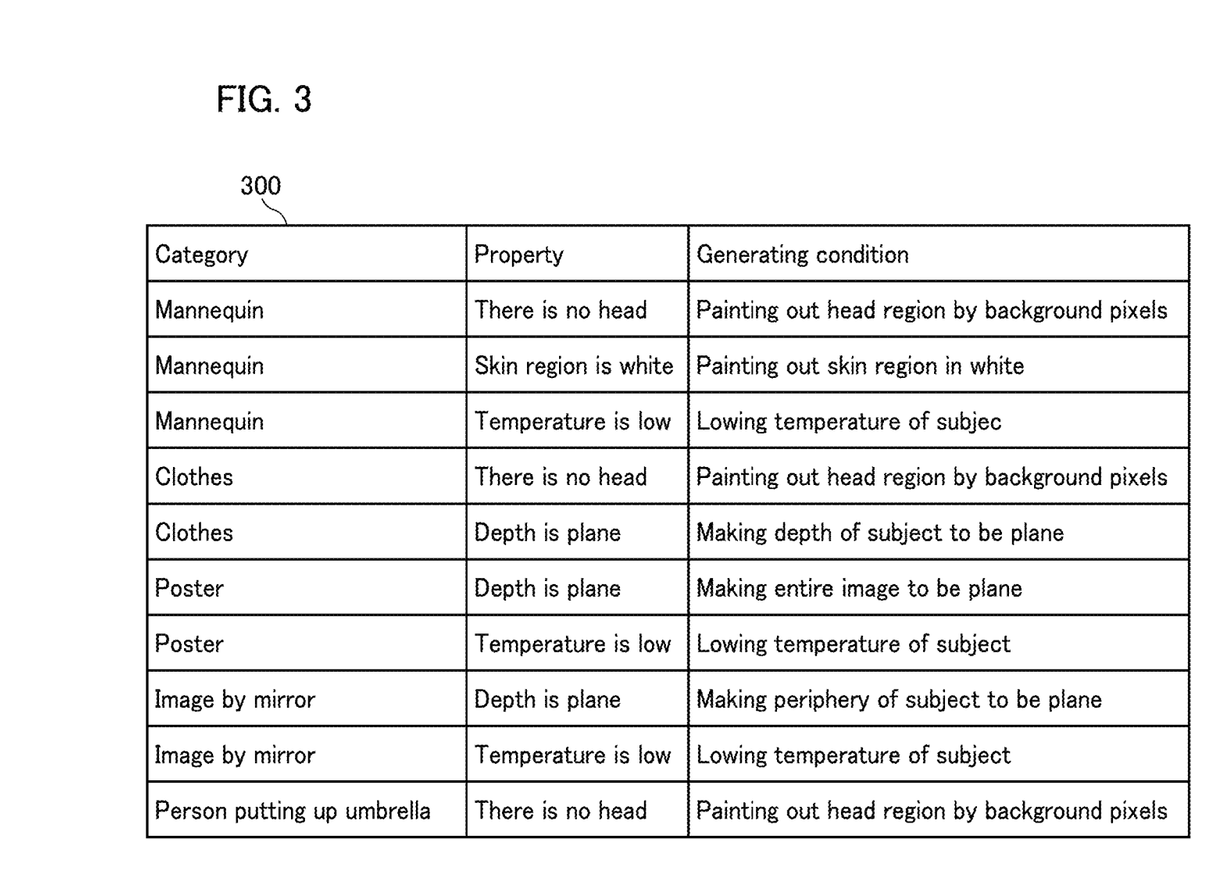
FIG. 3 is a diagram showing an example of data that are managed by an object property management unit according to the embodiment.

FIG. 3 is a diagram showing an example of data that are managed by the object property management unit 101 according to the embodiment. The category expresses the types of objects, and is information such as a mannequin, clothes, a poster, an image by a mirror, a person putting up an umbrella. Moreover, the property information expresses existence/non-existence of a part, color of a part, high/low of temperature, shape of depth, and is information such as that there is no head, a skin region is white, temperature is low, and a depth is a plane.

The generating condition expresses a content (a rule) of image conversion to be applied to learning data (teacher data) of an object which tends to be erroneously detected (i.e., the detection of which a user would like to restrain), and is information such as painting out a head region by background pixels. In an object property management table 300 shown in FIG. 3, with respect to "mannequins" as the category, "there being no head, the color of skin being white, and temperature being low" as the property and "painting out a head region by background pixels" as the generating condition are managed by being associated.

The input unit 102 acquires input information explained below from a user, and provides the input information to the generating condition determination unit 103. The input information is, for example, data set by the user while referring to the data in the object property management table 300. That is to say, for example, the data include restraint object category information expressing category information of an object of which detection is desired to be restrained and unrestraint object category information expressing category information of an object of which detection a user would not like to restrain. Furthermore, the data includes a combination of at least one or more of restraint object category information expressing category information of an object of which detection a user would like to restrain, unrestraint object category information expressing category information of an object of which detection the user would not like to restrain, and a generating condition expressing the generating condition the user would like to apply.

It should be noted that parameters related to a generating condition may be included in the input information. The parameters related to the generating condition are parameters when an image conversion is being executed according to the generating condition, and are pieces of information such as a size of a region in which conversion is to be executed, color, temperature, an angle of a depth, and a shape of the depth. The generating conditions shown in FIG. 3 are examples thereof. A user can prepare the aforementioned input information while confirming preview images or the like using the display unit 108. The preview images or the like on the display unit 108 will be explained below.

The generating condition determination unit 103 determines the generating condition to be applied to the learning data based on the input information by the user provided from the input unit 102 and the data managed by the object property management unit 101, and prepares a generating condition list. The generating condition list is what is made by arranging the generating conditions in a list. Moreover, the generating condition determination unit 103 provides the generating condition list that has been prepared to the generation unit 105.

In this context, a preparing method for the generating condition list will be explained. First, in a case in which the input information includes the restraint object category information or the restraint object property information, the generating condition corresponding thereto is acquired from the object property management unit 101, and is added to the generating condition list.

Moreover, in a case in which the input information includes the generating condition itself, this generating condition is added to the generating condition list. Furthermore, in a case in which the input information includes the unrestraint object category information or the unrestraint object property information, even if the generating condition corresponding thereto is once acquired from the object property management unit 101, this generating condition is excluded from the generating condition list.

Figure 4:
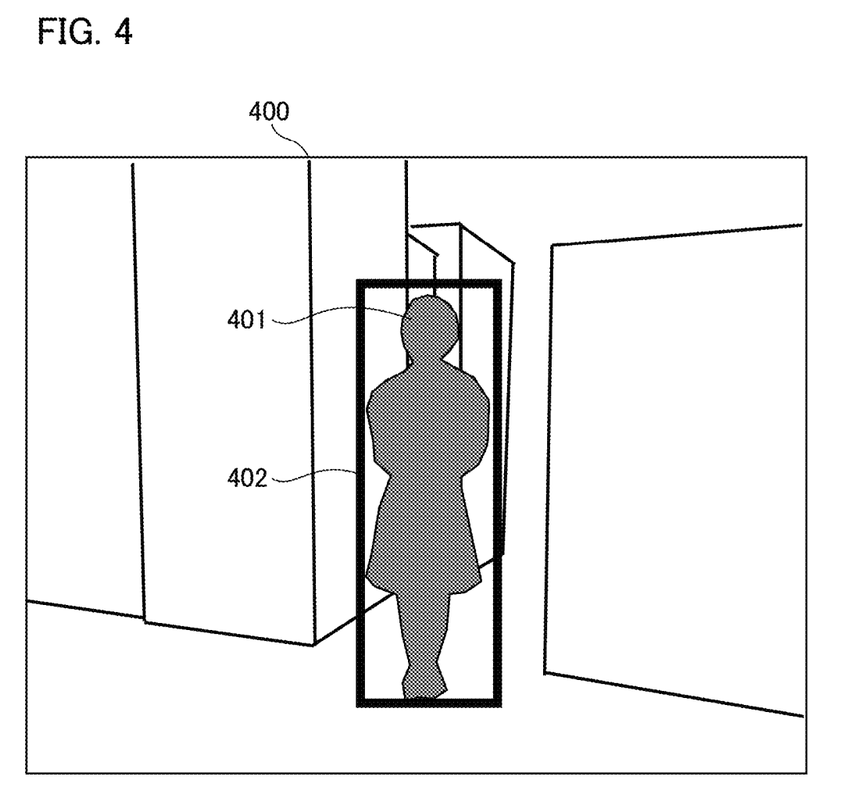
FIG. 4 is a diagram showing an example of learning data according to the embodiment.

The data acquisition unit 104 acquires the learning data, which is to be used for learning of CNN, including the teacher data. The data acquisition unit 104 provides the learning data having been acquired to the generation unit 105. FIG. 4 is a diagram showing an example of learning data according to the embodiment. An image 400 shows a detection subject 401, and rectangular information 402 is associated with it as Ground Truth. When the rectangular information 402 exists, learning is performed as a positive example (a positive instance).

Figure 5:
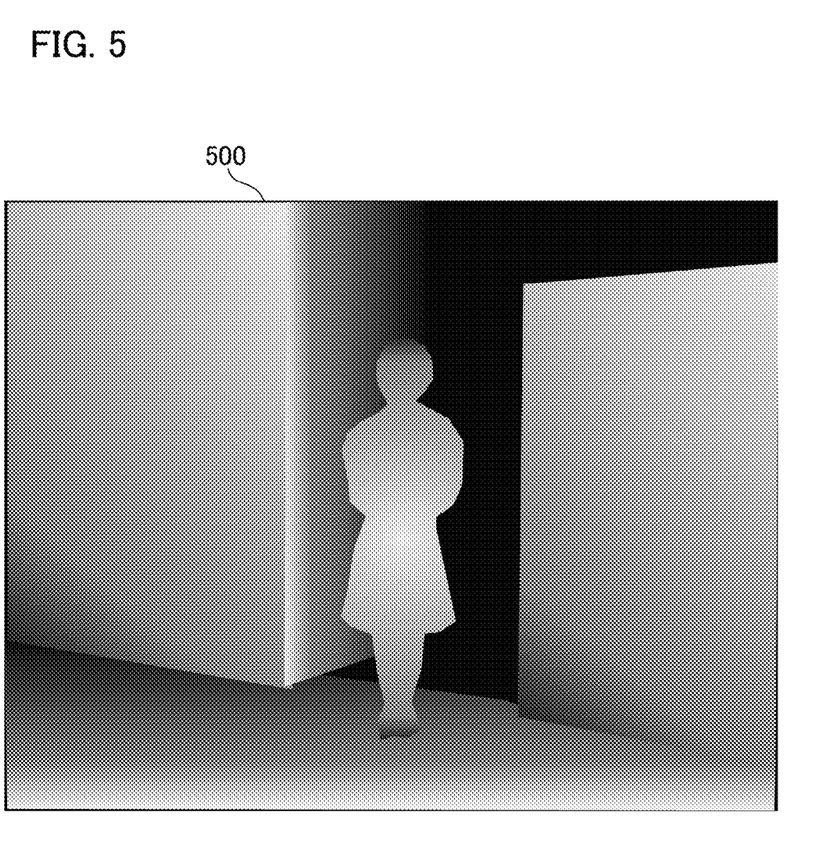
FIG. 5 is a diagram showing an example of an image acquired by a depth sensor according to the embodiment.

The image 400 acquired from the data acquisition unit 104 is, for example, an RGB image. However, it is sufficient to be a combination of at least one or more of an RGB image which can be acquired by a visible light sensor, a depth image which can be acquired by a depth sensor, and a temperature image which can be acquired by a temperature sensor. FIG. 5 is a diagram showing an example of an image acquired by a depth sensor according to the embodiment. Shades of colors represent the depth, and the paler the color, the shallower the depth is expressed. The depth image can be obtained by an output from the pixels, for example, of two imaging elements having parallax.

Figure 6:
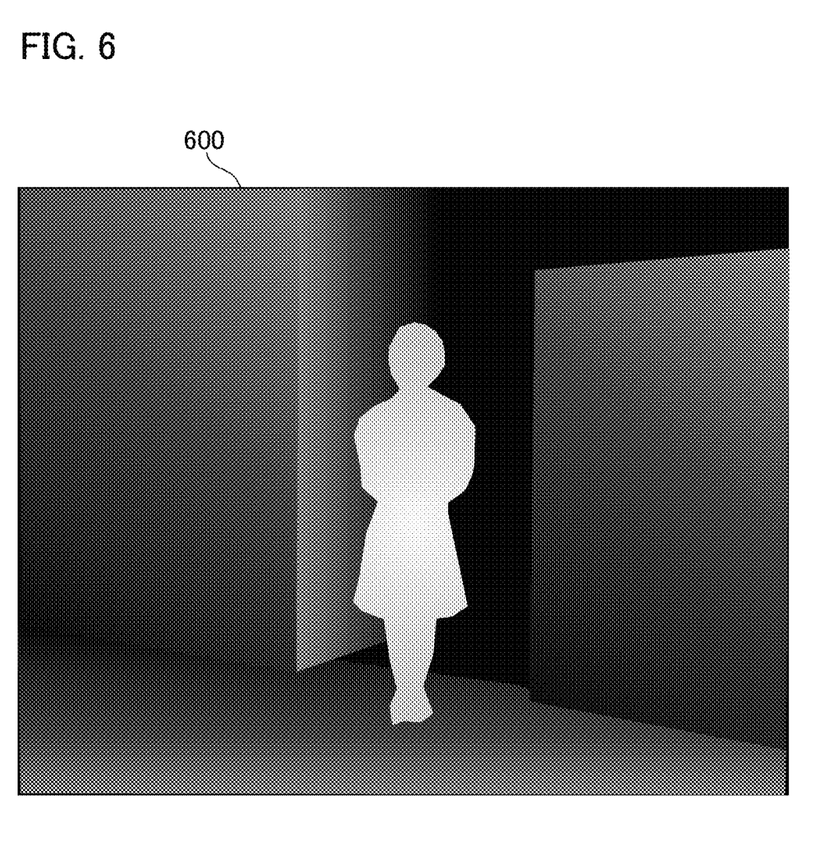
FIG. 6 is a diagram showing an example of an image acquired by a temperature sensor according to the embodiment.

FIG. 6 is a diagram showing an example of an image acquired by a temperature sensor according to the embodiment. Shades of colors represent the temperature, and the paler the color and the higher the temperature are expressed. The temperature image can be obtained by an imaging element having sensitivity to infrared light. It should be noted that a visible light sensor, a depth sensor, and a temperature sensor may also be configured by two-dimensionally disposing pixels for detecting visible light, pixels for detecting depth, pixels for detecting temperature, respectively, in the imaging surface of an imaging element at a predetermined pitch.

Alternatively, at least one of a visible light sensor, a depth sensor, and a temperature sensor may be configured as another two-dimensional sensor, and image-capturing of the same subject may be performed by each of the sensors so as to obtain each of the image outputs.

It should be noted that although the data acquisition unit 104 includes an image database storing images of such learning data as the teacher data, it may include an image sensor for acquiring images. Moreover, the learning data may include data other than the teacher data.

The generation unit 105 generates the generated learning data based on the generating conditions in the generating condition list provided from the generating condition determination unit 103 and on the learning data provided from the data acquisition unit 104. The generation unit 105 provides the generated learning data having been generated to the learning unit 106. Next, a generating method of the generated learning data will be explained.

First, the generation unit 105 assigns the learning data having been acquired to a normal learning use, a conversion learning use, and an evaluation use at a predetermined ratio.

Next, the generation unit 105 applies the generating conditions included in the generating condition list provided from the generating condition determination unit 103 to the learning images included in the learning data of the conversion learning use so as to obtain generated learning images. When there are N learning images and M pieces of generating conditions, the number of conversion learning images to be generated is total number of the combinations N times M.

Figure 7:
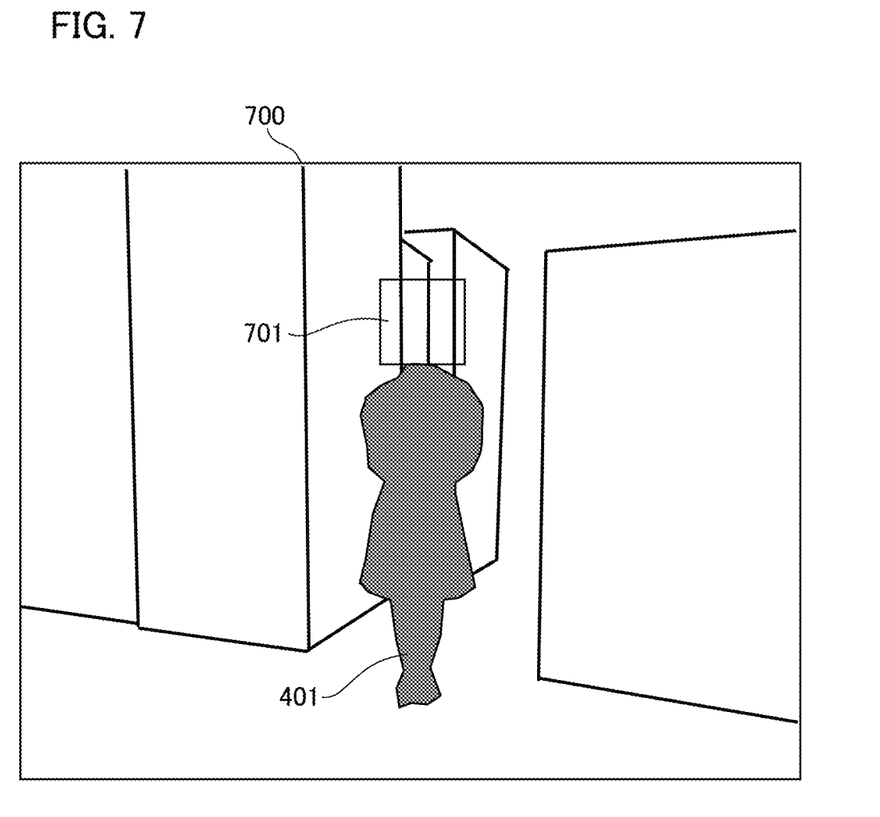
FIG. 7 is a diagram showing an example of an image in which a head region is painted out according to the embodiment.
Figure 8:
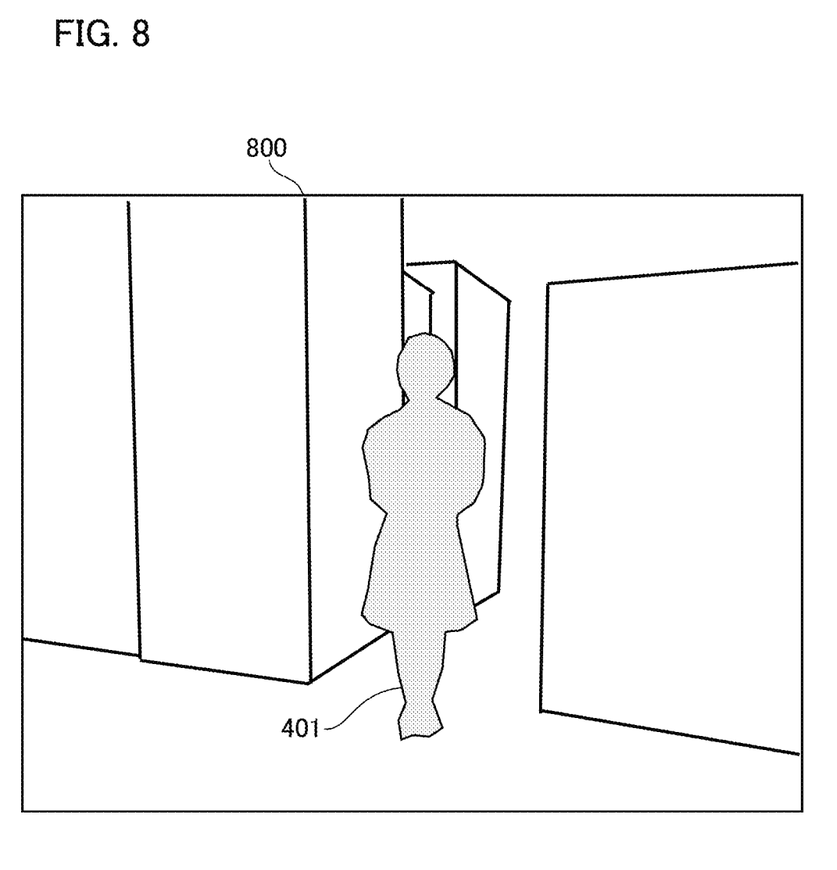
FIG. 8 is a diagram showing an example of an image in which the color of a person region is converted according to the embodiment.
Figure 9:
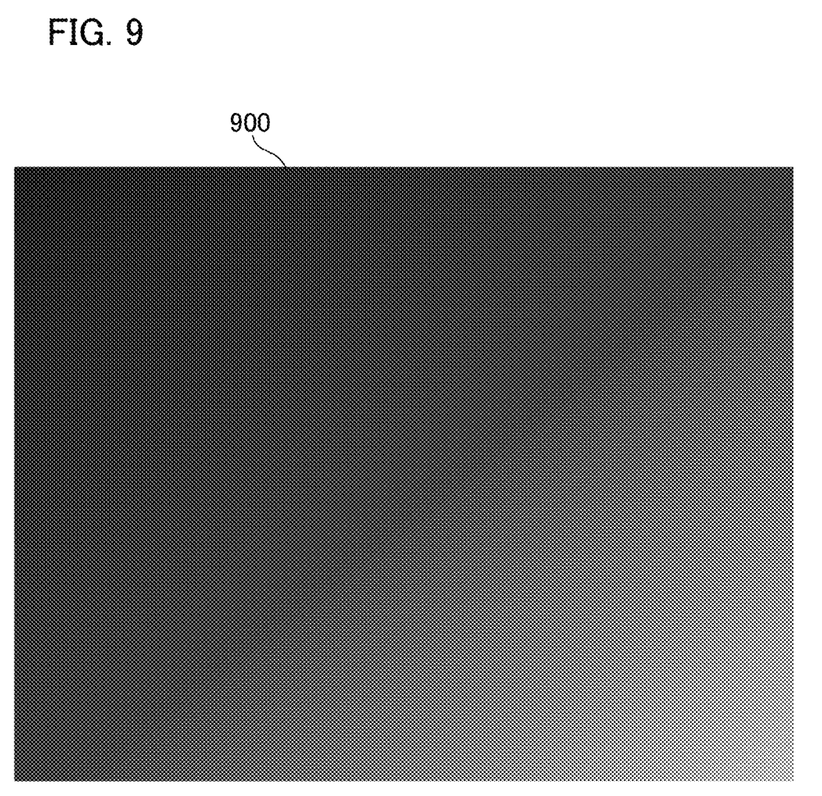
FIG. 9 is a diagram showing an example of an image in which depths are converted into planes according to the embodiment.
Figure 10:
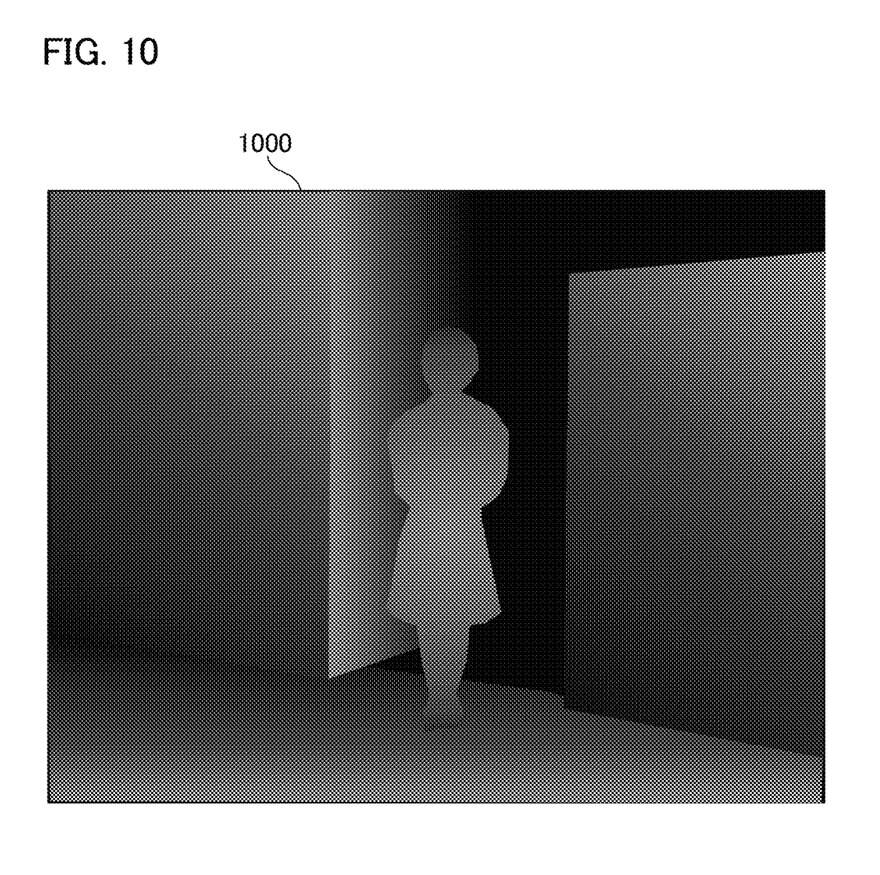
FIG. 10 is a diagram showing an example of an image in which the temperature of a subject region is converted into a lower one according to the embodiment.

FIG. 7 is a diagram showing an example of an image in which a head region is painted out according to the embodiment, and shows an image 700 in which the generating condition that "the head region is painted out by the background pixels" has been applied to the image 400 in FIG. 4. FIG. 8 is a diagram showing an example of an image in which the color of a person region has been converted according to the embodiment, and shows an image 800 in which the generating condition that "the skin region is painted out in white" has been applied to the image 400. FIG. 9 is a diagram showing an example of an image in which depths are converted into planes according to the embodiment, and shows an image 900 in which the generating condition that "the entire image is made to be a plane" has been applied to a depth image 500 in FIG. 5. FIG. 10 is a diagram showing an example of an image in which the temperature of a subject region is converted into lower one according to the embodiment and shows an image 1000 in which "lowing the temperature of the subject" has been applied to a temperature image 600 in FIG. 6.

In this manner, the generation unit 105 performs at least one of an image conversion of painting out a specific portion, an image conversion of changing the color of the specific portion, an image conversion of replacing depth information with a specific pattern, and an image conversion of changing temperature of a detection subject.

When the generating conditions shown in FIGS. 7 to 10 are applied, the generation unit 105 generates data in which the label of a positive example (a positive instance), corresponding to the conversion learning data to which the generating conditions have been applied, is converted into a negative example (a negative instance). That is to say, the generation unit 105 converts the teacher data of the positive instance into the teacher data of the negative instance according to a preset rule when generating the generated learning data. Specifically, for example, the rectangular information 402 in the learning data in FIG. 4 is to be deleted.

Furthermore, the generation unit 105 unifies the learning data assigned to the normal learning use and the learning data that are assigned to the conversion learning use and that have been generated by applying the generating conditions, and provides the unified data to the learning unit 106 as the generated learning data. Moreover, the generation unit 105 provides the learning data assigned to the evaluation use to the evaluation unit 107 as evaluation data.

The learning unit 106 is what executes processing similar to that in learning of a general object detection CNN, and performs learning a predetermined CNN using the learning data provided from the generation unit 105. The learning unit 106 provides a CNN model that has been learned to the evaluation unit 107.

The evaluation unit 107 is what executes processing similar to that in learning of a general object detection CNN, and performs the evaluation of detection accuracy based on the CNN model that has been learned provided from the learning unit 106 and on the evaluation data provided from the generation unit 105.

Specifically, the evaluation unit 107 classifies Ground Truth and an inferred result of the CNN model that has been learned included in the evaluation data into a positive detection, an undetection, and an erroneous detection based on IoU (Intersection over Union), and obtains an F value from the numbers of TP (True Positive), TN (True Negative), FP (False Positive), and FN (False Negative).

Moreover, the evaluation unit 107 seeks existence/non-existence of a portion, color of a portion, depth information, and temperature information of subjects of examples that have been erroneously detected and that have been undetected, and provide them to the generating condition determination unit 103 as an erroneously detected object property and an undetected object property.

The generating condition determination unit 103 corrects the generating condition list based on the erroneously detected object property and the undetected object property acquired from the evaluation unit 107.

A method of correcting the generating condition list will be explained. The generating condition determination unit 103 acquires the generating condition, corresponding to the erroneously detected object property acquired from the evaluation unit 107, from the object property management unit 101. The generating condition determination unit 103 adds the generating condition that has been acquired to the generating condition list. Next, generating condition determination unit 103 acquires the generating condition, corresponding to the undetected object property acquired from the evaluation unit 107, from the object property management unit 101. The generating condition determination unit 103 excludes the generating condition that has been acquired from the generating condition list.

The display unit 108 displays the set contents of the generating conditions and the generated result in order to support the generating of the input information by the user.

Figure 11:
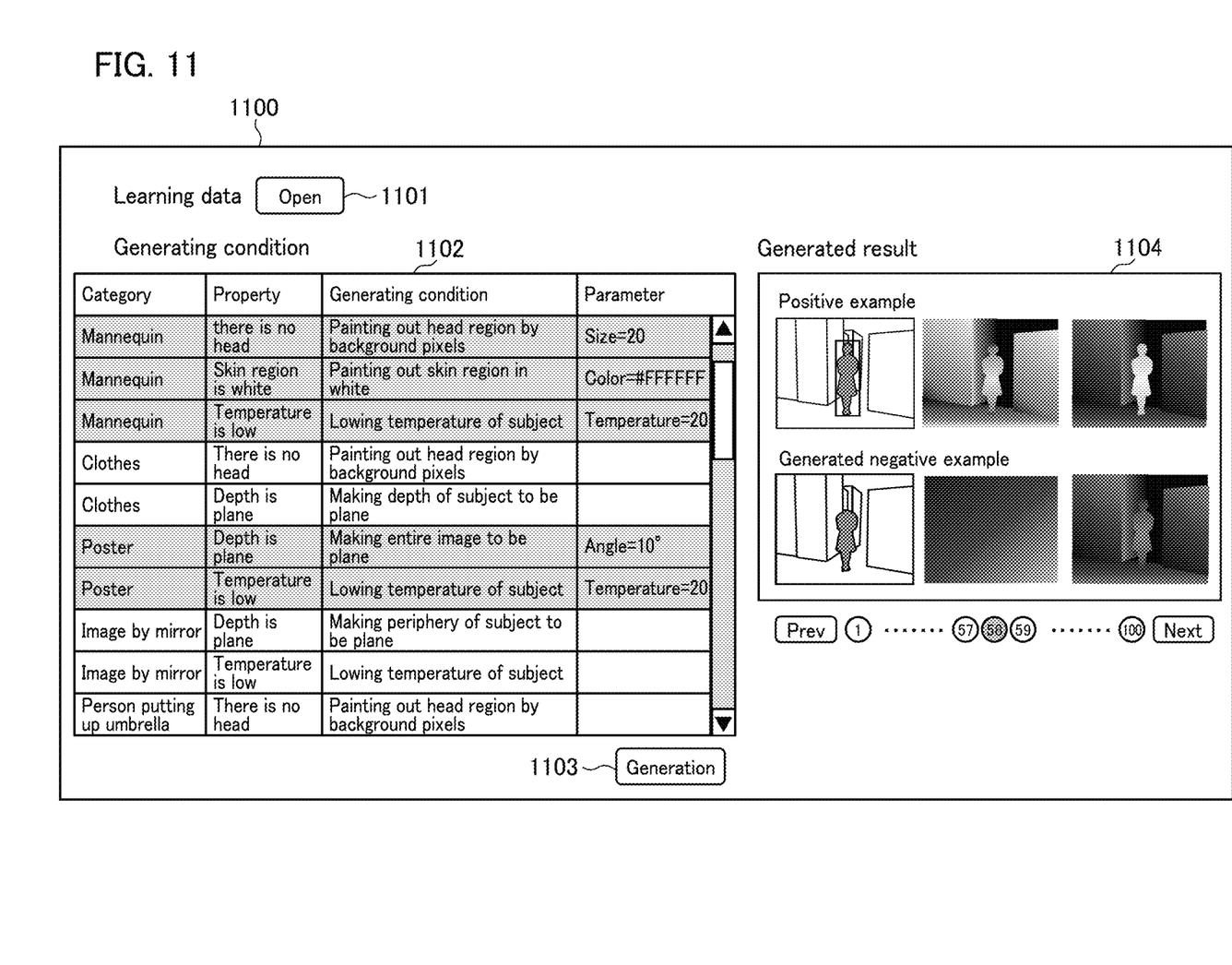
FIG. 11 is a diagram showing an example of a UI for inputting a generating condition and for confirming the generated result according to the embodiment.

FIG. 11 is a diagram showing an example of a UI (User Interface) for inputting a generating condition and for confirming the generated result according to the embodiment, and shows an example of a generating condition setting UI 1100 for inputting the generating condition, for confirming the generated result, and for setting the generating condition, on the display unit 108. The user is able to specify the learning data acquired by the data acquisition unit 104 by using a learning data deployment button 1101 based on the generated result displayed on the display unit 108.

Moreover, by the input unit 102i, t is possible to specify and set the generating condition such as categories, properties, conversion conditions, parameters to be specified, on the generating condition setting table 1102. The generating condition setting table 1102 is based on the object property management table 300 stored in the object property management unit 101.

The user is able to cyclically perform changing in a sequence of not being set, setting as a restraint condition, setting as an unrestraint condition, and returning to not being set by clicking each of rows in the generating condition setting table 1102, thus it is possible to set multiple restraint conditions and unrestraint conditions. Moreover, after completion of setting, a process of the generation unit 105 is started by clicking a generation button 1103.

The user is able to perform previewing of the generated learning data using the display unit 108. When generation button 1103 has been clicked, a generated result confirming screen 1104 displays the generated learning data having been generated by the generation unit 105, for example, in a small screen size having low resolution. Thereby, the calculation load can be reduced. The user is able to confirm the positive example and the negative example that have been generated and that are displayed on the generated result confirming screen 1104, and to correct the generating conditions.

It should be noted that the category of the object property management unit 101 shown in the generating condition setting table 1102 may be information that shows the type of an object, and it is not limited to specific type information. Moreover, the property information may be information that expresses property of an object, and it is not limited to the specific property information such as shown in FIG. 11. Furthermore, it is sufficient for the generating condition may be information which expresses contents of image conversion, and it is not limited to the specific generating conditions such as shown in FIG. 11.

The generation unit 105 may assign one learning datum to both the normal learning use and the conversion learning use when assigning the learning data to the normal learning use and to the conversion learning use. Moreover, the data for the evaluation use may be acquired from an evaluation data acquisition unit, which is not shown in the drawings, and thereby, the learning data are allowed not to be assigned to the evaluation use.

The generating condition, which is to be applied to learning images of the generation unit 105, may be a combination of at least one or more, and multiple generating conditions may be applied to one image, and alternatively, there may be generating conditions which are not applied to predetermined learning images. The ratio of the number of images to be generated by each of the generating conditions may be determined by obtaining the user's input from the input unit 102, and alternatively, it may be determined based on a frequency added to the generating condition list in the generating condition determination unit 103.

The conversion from positive example labels into negative example labels of some of the generated learning data in the generation unit 105 may be a conversion by which an example is handled as a negative example in the learning unit 106, and it is not limited to a specific conversion method. For example, the conversion may be one in which a flag indicates being a negative example.

Moreover, a displaying method for the generating conditions of the display unit 108 may be configured in such a manner that a pulldown menu is prepared for each of the generating conditions, and a selection of not being set, setting as a restraint condition, or setting as an unrestraint condition may be made possible, and alternatively, radio buttons may be prepared, and thereby, selection may be made possible.

In other words, the UI may be sufficient as long as the category, the property of an object, the generating condition, and the parameters can be specified, and it is not limited to the specific UI as shown in FIG. 11.

The generated result confirming screen 1104 for previewing of the display unit 108 may display all of the negative examples having been generated side by side, alternatively, previewing of the generated images may be performed prior to processing by the generation unit 105. That is to say, the displaying method may be one in which a user is able to visually confirm the generated images prior to the generation by the generation unit 105, and it is not limited to the specific method such as shown in FIG. 11.

Figure 12:
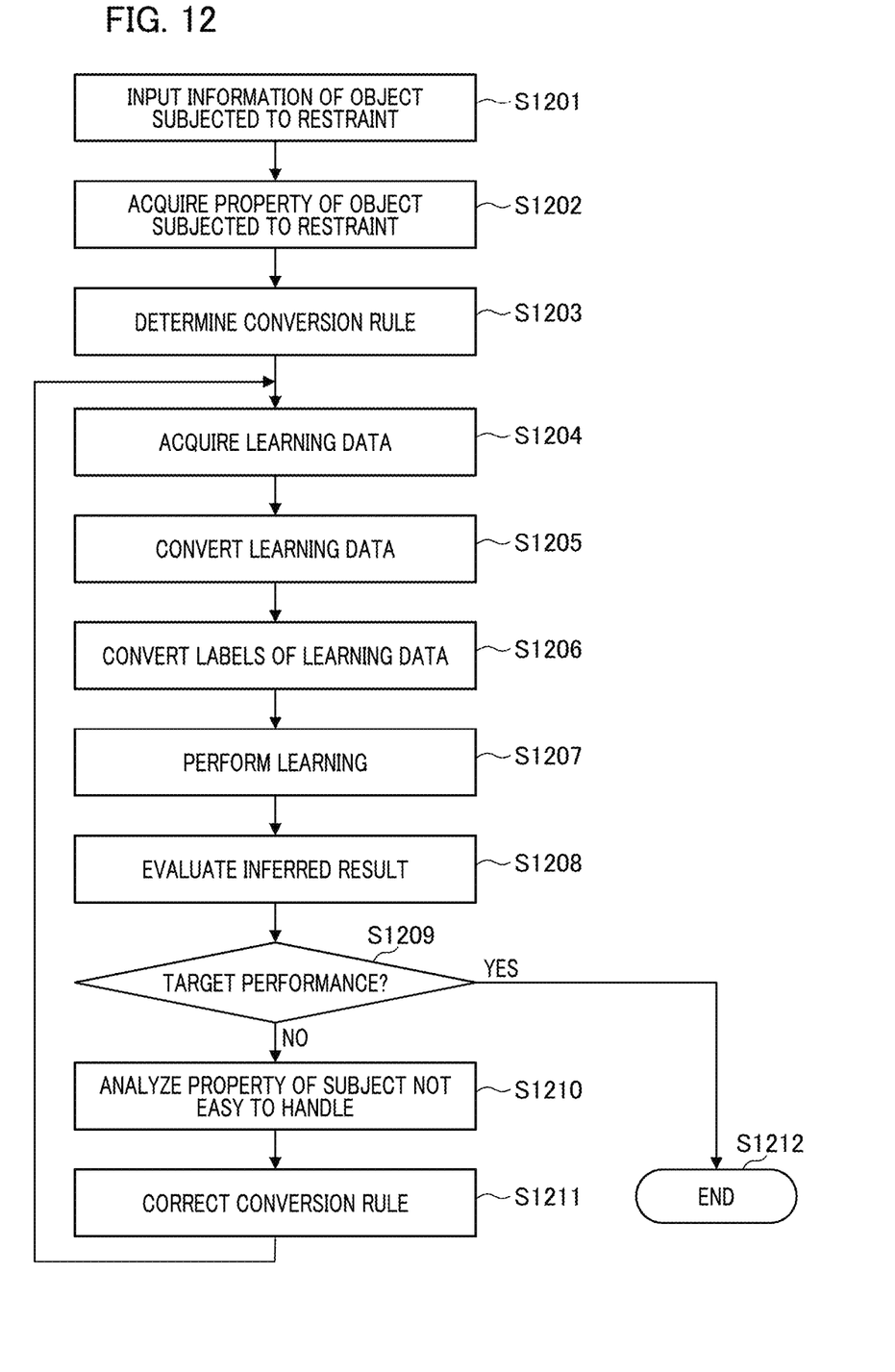
FIG. 12 is an overall flowchart of the embodiment.

Next, FIG. 12 is an overall flowchart of the embodiment, and the above operation flow will be explained with reference to FIG. 12. First, in step S1201, the category information of an object subjected to restraint is input using the input unit 102. Next, in step S1202, the generating condition determination unit 103 acquires a corresponding generating condition from the object property management unit 101 by using the category information of the object subjected to restraint.

Next, in step S1203, based on the generating conditions having been acquired, the generating condition determination unit 103 generates, the generating condition list by determining a conversion rule for applying a predetermined conversion processing to the image of an object subjected to restraint. Then, in step S1204, the learning data are acquired by using the data acquisition unit 104 from a storage medium, which is not shown in the drawings, included in the data acquisition unit 104. That is to say, step S1204 functions as a data acquisition step in which the learning data serving as teacher data are acquired.

Next, in step S1205, the generation unit 105 converts the learning data based on the above conversion rule while using the learning data and the generating condition list, and thereby, generates the generated learning data and also prepares the evaluation data. That is to say, step S1205 functions as a generation step in which the generated learning data are generated based on the learning data and the generating conditions.

Next, in step S1206, for the learning image to which the generating condition has been applied, the data obtained by converting the Ground Truth label into a negative example label are generated, i.e., the data in which, for example, the rectangular information 402 in FIG. 4 is deleted are generated. Next, in step S1207, the learning unit 106 performs learning of object detection CNN using the generated learning data in which some of labels have been converted into negative example labels, and generates a learned CNN model.

Next, in step S1208, the evaluation unit 107 evaluates the inferred result of the CNN model using the learned CNN model and the evaluation data. That is to say, the F value is obtained from the numbers of TP (True Positive), TN (True Negative), FP (False Positive), and FN (False Negative).

Next, in step S1209, if it is determined that an evaluation result achieves a preset target performance (for example, the F value is a predetermined value or less), the process ends in step S1212, and if it is determined not to be achieved, the process proceeds to step S1210. Next, in step S1210, based on the evaluation result, the property information or the like of an object that has been erroneously detected is analyzed, and the category information, the property thereof, and the like of the erroneously detected object are obtained. Next, in step S1211, based on the property information of the erroneously detected object, the generating condition determination unit 103 corrects the generating conditions in the generating condition list, i.e., corrects the conversion rule by which what image conversion is applied to an object of what category information.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions. In addition, as a part or the whole of the control according to this embodiment, a computer program realizing the function of the embodiment described above may be supplied to the learning data generating apparatus or the like through a network or various storage media. Then, a computer (or a CPU, an MPU, or the like) of the learning data generating apparatus or the like may be configured to read and execute the program. In such a case, the program and the storage medium storing the program configure the present invention.

This application claims the benefit of Japanese Patent Application No. 2020-208102 filed on Dec. 16, 2020, which is hereby incorporated by reference herein in its entirety.

What is claimed is:

1. A learning data generating apparatus comprising:
at least one processor or circuit; and
at least one memory that stores an instruction configured to be executed by the at least one processor or circuit, the instruction thereby causing the learning data generating apparatus to:
  acquire first learning data including teacher data; and
  generate second learning data based on the first learning data and a generating condition,
wherein the processor or circuit converts at least one of labels of the first learning data from a positive instance into a negative instance by converting teacher data of the positive instance into teacher data of the negative instance according to a preset rule to generate the second learning data.

2. The learning data generating apparatus according to claim 1, wherein the processor or circuit performs at least one of an image conversion of painting out a specific portion, an image conversion of changing color of the specific portion, an image conversion of replacing depth information with a specific pattern, and an image conversion of changing temperature of a detection subject.

3. The learning data generation device according to claim 1, wherein the processor or circuit further acquires category information of a restraint object or of an unrestraint object.

4. The learning data generating apparatus according to claim 1, wherein the processor or circuit further acquires a property of a restraint object or unrestraint object.

5. The learning data generating apparatus according to claim 1, wherein the processor or circuit further manages category information of an object and the generating condition.

6. The learning data generating apparatus according to claim 1, wherein the processor or circuit learns a CNN by using the second learning data that have been generated, and
wherein the processor or circuit evaluates the CNN that has been learned.

7. The learning data generating apparatus according to claim 6, wherein the generating condition is corrected based on property information of an object which has been erroneously detected.

8. The learning data generating apparatus according to claim 1, further comprising:
a display screen configured to display contents of the generating condition and a generated result; and
a UI for setting the generating condition based on the generated result displayed on the display screen.

9. A learning data generating method, the method comprising:
a data acquisition step of acquiring first learning data as teacher data; and
a generation step of generating second learning data based on the first learning data and a generating condition,
wherein the generation step converts at least one of labels of the first learning data from a positive instance into a negative instance by converting teacher data of the positive instance into teacher data of the negative instance according to a preset rule to generate the second learning data.

10. A non-transitory computer-readable storage medium configured to store a computer program for a learning data generating apparatus to execute the following steps:
a data acquisition step of acquiring first learning data as teacher data; and
a generation step of generating second learning data based on the first learning data and a generating condition,
wherein the generation step converts at least one of labels of the first learning data from a positive instance into a negative instance by converting teacher data of the positive instance into teacher data of the negative instance according to a preset rule to generate the second learning data.

* * * * *